United States Patent
Yakabe et al.

(10) Patent No.: US 6,800,677 B2
(45) Date of Patent: Oct. 5, 2004

(54) FLAME RETARDANT REINFORCED POLYAMIDE RESIN COMPOSITION

(75) Inventors: Sadayuki Yakabe, Nobeoka (JP); Teizi Gotou, Nobeoka (JP)

(73) Assignee: Asahi Kasei Kabushiki Kaisha, Osaka (JP)

(*) Notice: Subject to any disclaimer, the term of this patent is extended or adjusted under 35 U.S.C. 154(b) by 48 days.

(21) Appl. No.: 10/101,608

(22) Filed: Mar. 21, 2002

(65) Prior Publication Data

US 2002/0151625 A1 Oct. 17, 2002

Related U.S. Application Data

(63) Continuation-in-part of application No. PCT/JP00/06909, filed on Oct. 4, 2000.

(30) Foreign Application Priority Data

Mar. 21, 2001 (JP) ........................................ 2001-080889
Mar. 26, 2001 (JP) ........................................ 2001-087493

(51) Int. Cl.$^7$ .......................................... C08K 5/3467
(52) U.S. Cl. ................................................... 524/100
(58) Field of Search ........................................ 524/100

(56) References Cited

U.S. PATENT DOCUMENTS 6,025,419 A * 2/2000 Kasowski et al. .......... 524/100

FOREIGN PATENT DOCUMENTS

| JP | 58-174440 A | 10/1983 |
|---|---|---|
| JP | 62-116661 A | 5/1987 |
| JP | 1-301750 A | 12/1989 |
| JP | 4-202429 A | 7/1992 |
| JP | 11-29711 A | 2/1999 |
| JP | 11-106644 A | 4/1999 |
| JP | 11-343389 A | 12/1999 |
| JP | 2000-119512 A | 4/2000 |
| WO | WO 98/45364 A1 | 10/1998 |

* cited by examiner

Primary Examiner—Peter Szekely
(74) Attorney, Agent, or Firm—Birch, Stewart, Kolasch & Birch, LLP (57) ABSTRACT

A flame-retardant reinforced polyamide resin composition comprising (a) a half-aromatic polyamide resin having a hexamethylene adipamide unit and a hexamethylene isophthalamide unit, (b) a melamine polyphosphate and (c) an inorganic reinforcing material, and, if necessary, (d) a polyalkylene polyhydric alcohol and/or a fatty acid ester derivative thereof, (e) a bisamide compound, (f) a metal oxide and/or a molybdate, and (g) a metal salt of a higher fatty acid having 10–25 carbon atoms. According to the composition of the present invention, molding materials can be provided which are very high in flame retardancy even when they are molded into thin-wall moldings, do not generate corrosive hydrogen halide gases during burning and, furthermore, have both excellent electric characteristics and excellent molding processability.

16 Claims, 1 Drawing Sheet

FIG. 1

FLAME RETARDANT REINFORCED POLYAMIDE RESIN COMPOSITION

RELATED APPLICATIONS

This application is a continuation-in-part of International PCT application No. PCT/JP00/06909, filed Oct. 4, 2000 and designating the United States.

TECHNICAL FIELD

The present invention relates to a flame retardant polyamide resin composition, and particularly to a flame retardant polyamide resin composition suitably usable for parts such as connectors, breakers, magnetic switches, etc. in the electrical and electronic fields and electronic parts in the field of automobiles. Furthermore, the present invention relates to a flame retardant reinforced polyamide resin composition which is very high in flame retardancy, does not generate corrosive hydrogen halide gases at the time of burning and has both excellent electric characteristics and excellent molding processability.

BACKGROUND ART

Hitherto, polyamide resins have been used in the fields of automobile parts, mechanical parts, electric and electronic parts, etc. because of their excellent mechanical strength, heat resistance, etc. However, in the recent uses for electric and electronic parts, the level of requirement for flame retardancy is increasing, and the flame retardancy is required to be much higher than the self-extinguishing properties which the polyamide resins possess inherently. Therefore, intensive investigations have been conducted on increasing the flame retardancy level to meet the UL94V-0 standard of Underwriters Laboratories, and generally it has been attempted to improve flame retardancy of polyamide resins by adding halogen-based flame-retarding agents or triazine-based flame-retarding agents to polyamide resins.

For example, there are known the addition of chlorine-substituted polycyclic compounds to polyamide resins (JP-A-48-29846), addition of bromine-based flame-retarding agents such as decabromodiphenyl ether (JP-A-47-7134), addition of brominated polystyrene (JP-A-51-47044, JP-A-4-175371), addition of brominated polyphenylene ether (JP-A-54-116054), addition of brominated cross-linked aromatic polymers (JP-A-63-317552), addition of brominated styrene-maleic anhydride polymers (JP-A-3-168246), etc. Compositions obtained by adding these halogen-based flame-retarding agents to glass fiber-reinforced polyamide resins have high flame retardancy and high stiffness, and, hence, have been widely used for electric and electronic parts, especially, connectors mounted on or connected with printed circuit laminates. However, halogen-based flame-retarding agents are believed to generate highly corrosive hydrogen halide gases and smoke or to generate toxic materials at the time of combustion, and because of these environmental problems, there is a trend to inhibit the use of plastic products containing the halogen-based flame-retarding agents.

Under the circumstances, triazine-based flame-retarding agents free of halogen have been noted and various investigations have been made on these flame-retarding agents. For example, there are well known a method of using melamine as a flame-retarding agent (JP-B-47-1714), a method of using cyanuric acid (JP-A-50-105744), and a method of using melamine cyanurate (JP-A-53-31759). Non-reinforced polyamide resin compositions obtained by these techniques have a high flame retarding level meeting the requirements of the UL94V-0 standard, but when these compositions are reinforced with inorganic reinforcing materials such as glass fibers to enhance their stiffness, the cotton ignition phenomenon occurs at the time of combustion even if the flame-retarding agents are added in a large amount, and thus they do not meet the requirements of the UL94V-0 standard.

On the other hand, there have been proposed a flame retarding technique which is free from halogen and which uses intumescent type flame-retarding agents such as melamine phosphate, melamine pyrophosphate and melamine polyphosphate in glass fiber-reinforced polyamide resins (JP-A-10-505875), and a technique of adding melamine polyphosphate to polyamide resins reinforced with inorganic materials and further using a charring catalyst and/or a char forming agent (WO98/45364). It is known that moldings thereof having a thickness of 1/16 inch meet the requirements of the UL94V-0 standard. However, according to these techniques, melamine phosphate-based flame-retarding agents must be used in large amounts in order that thin-wall moldings of 1/32 inch thick, which are especially demanded for uses as connectors of electric and electronic parts, meet the requirements of the UL94V-0 standard. When the melamine phosphate-based flame-retarding agents are used in large amounts, not only are the glass fiber-reinforced polyamide resin compositions seriously deteriorated in mechanical characteristics, but also they are inferior in electric characteristics, particularly, tracking resistance which is required for electric parts used under high voltage environments. Moreover, when the melamine phosphate-based flame-retarding agents are used in large amounts, releasability from the mold at the time of molding is inferior, and, furthermore, molding for a long period of time at high molding temperatures is apt to cause corrosion of the mold. Thus, the compositions are not necessarily satisfactory as molding materials for electric and electronic parts.

Furthermore, there is disclosed a technique of applying melamine sulfate which is an intumescent type flame-retarding agent to glass fiber-reinforced half-aromatic polyamide resins for meeting the requirement of the UL94V-0 standard as thin-wall moldings of 1/32 inch thick (JP-A-2000-11951), but this technique also requires the addition of the flame-retarding agent in a large amount for the amount of the polyamide resin component, and suffers from the same problems as above.

Moreover, as a technique for imparting a high tracking resistance which meets the requirement of the UL94V-0 standard as thin-wall moldings of 1/32 inch thick, there is proposed a technique of adding a melamine phosphate composite flame-retarding agent and an alkaline earth metal salt to inorganic material-reinforced polyamide resins (WO00/09606), but moldings obtained by this technique are brittle, and when applied to, for example, connectors having complicated shapes, there are problems that the connectors are broken or cracked during handling or transportation.

The object of the present invention is to provide a flame retardant reinforced polyamide resin composition which is very high in flame retardancy, does not generate hydrogen halide gases having corrosiveness at the time of combustion and has both excellent electric characteristics and excellent molding processability.

DISCLOSURE OF INVENTION

As a result of intensive research conducted by the inventors, it has been found that the above object can be attained by using a half-aromatic polyamide resin having a specific structure as a polyamide resin in a system comprising a combination of an inorganic reinforcing material, a melamine polyphosphate and a polyamide, and thus the present invention has been accomplished.

That is, the present invention is directed to a flame retardant reinforced polyamide resin composition comprising (a) 30–70% by weight of a half-aromatic polyamide resin having a hexamethylene adipamide unit and a hexamethylene isophthalamide unit, (b) 10–38% by weight of a melamine polyphosphate and (c) 5–50% by weight of an inorganic reinforcing material.

Furthermore, if necessary, the flame retardant reinforced polyamide resin composition of the present invention may further comprise (d) 0–5% by weight of a polyalkylene polyhydric alcohol and/or a fatty acid ester derivative thereof, (e) 0–5% by weight of a bisamide compound, (f) 0–5% by weight of a metal oxide and/or a molybdate, and (g) 0–5% by weight of a metal salt of a higher fatty acid having 10–25 carbon atoms in addition to the above components (a)–(c).

Moreover, in the flame retardant reinforced polyamide resin composition of the present invention, it is preferred that the ratio of amounts of the half-aromatic polyamide resin and the melamine polyphosphate is in the range of 1.5–3.5.

BEST MODE FOR CARRYING OUT THE INVENTION

The present invention will be specifically explained below.

<Component (a)>

The half-aromatic polyamide resins used in the present invention are polyamide resins containing a hexamethylene adipamide unit and a hexamethylene isophthalamide unit as main constituting components, and these half-aromatic polyamide resins include copolymers containing a polyhexamethylene adipamide unit (hereinafter sometimes referred to as "polyamide 66 unit") and a polyhexamethylene isophthalamide unit (hereinafter sometimes referred to as "polyamide 6I unit") and polyamide mixtures (mixed polyamides) containing a polyhexamethylene adipamide component (hereinafter sometimes referred to as "polyamide 66 component") and a polyhexamethylene isophthalamide component (hereinafter sometimes referred to as "polyamide 6I component").

Especially, when a half-aromatic polyamide resin containing 5–30% by weight of a hexamethylene isophthalamide unit is combined with a melamine polyphosphate, high flame retardancy is obtained, which is preferred.

As the half-aromatic polyamide resins of the present invention, specifically, copolymers comprising 70–95% by weight of a polyamide 66 unit and 5–30% by weight of a polyamide 6I unit (polyamides 66/6I) are preferred because they satisfy heat resistance, appearance of moldings, molding processability, and electric characteristics, and copolymers comprising 70–90% by weight of a polyamide 66 unit and 10–30% by weight of a polyamide 6I unit are especially preferred because they have excellent flame retardancy and superior releasability during molding in addition to the above characteristics.

Furthermore, mixed polyamides containing 70–95% by weight of a polyamide 66 component and 5–30% by weight of a polyamide 6I component are high in heat resistance and are preferred for uses that require soldering resistance.

In addition, terpolymers comprising 60–89% by weight of a polyamide 66 unit, a part of which is replaced with other aliphatic polyamide units, 5–30% by weight of a polyamide 6I unit and 1–10% by weight of an aliphatic polyamide unit other than the polyamide 66 are superior in fluidity at molding. As these terpolymers, mention may be made of, for example, terpolymers in which a part of the polyamide 66 unit is replaced with an aliphatic polyamide unit selected from a polycapramide unit (polyamide 6 unit), polyundecamide unit (polyamide 11 unit), polydodecamide unit (polyamide 12 unit), polyhexamethylene sebacamide unit (polyamide 610 unit) or polyhexamethylene dodecamide unit (polyamide 612 unit), namely, polyamide 66/6I/6, polyamide 66/6I/11, polyamide 66/6I/12, polyamide 66/6I/610, and polyamide 66/6I/612.

Furthermore, the object of the present invention can also be attained by using mixed polyamides containing 60–89% by weight of a polyamide 66 component, 5–30% by weight of a polyamide 6I component and 1–10% by weight of an aliphatic polyamide component other than the polyamide 66 component as the half-aromatic polyamide resins of the present invention.

When the amount of the polyhexamethylene isophthalamide unit in the copolymers or that of the polyhexamethylene isophthalamide component in the mixed polyamides is in the range of 5–30% by weight, a sufficient flame retardation level can be attained without adding the flame-retarding agent in a large amount, and the compositions are excellent in heat resistance, molding processability and electric characteristics.

The aforementioned copolymers may be either random copolymers or block copolymers, and these copolymers may contain other aromatic polyamide resins as copolymer components in such a range that the attainment of the object of the present invention is not hindered. The mixed polyamides of the present invention are polyamides obtained by mixing polyamides comprising two or more components by general methods such as blending, melt kneading, etc. other than a polymerization method. The molecular weight of the half-aromatic polyamide resins used in the present invention is not particularly limited as far as molding is concerned, but when polyamide resins having a sulfuric acid relative viscosity of 1.5–3.5 as specified in JIS K6810 are used, fluidity at molding is good and a high flame retardation level can be maintained, and thus it is preferred to use such polyamide resins.

<Component (b)>

The melamine polyphosphates used in the present invention are represented by the following chemical formula: $(C_3H_6N_6 \cdot HPO_3)$, (in the formula, n denotes a condensation degree), and mean those which are obtained from reaction products of substantially equimolar melamine and phosphoric acid or polyphosphoric acid. The process for producing the melamine polyphosphates used in the present invention has no special limitation. Usually, mention may be made of melamine polyphosphates obtained by heat condensation of melamine phosphates in a nitrogen atmosphere. The phosphoric acids constituting the melamine phosphates include specifically orthophosphoric acid, phosphorous acid, hypophosphorous acid, metaphosphoric acid, pyrophosphoric acid, triphosphoric acid, tetraphosphoric acid, etc. Especially, melamine polyphosphates obtained by condensation of adducts of orthophosphoric acid or pyrophosphoric acid with melamine are preferred because they are high in the effects as flame-retarding agents. Furthermore, the condensation degree n of the melamine polyphosphates is preferably more than 3, especially preferably not less than 5 from the point of heat resistance.

Moreover, the melamine polyphosphates may be equimolar addition salts of polyphosphoric acid and melamine, and the polyphosphoric acid which forms the addition salts with melamine includes chain polyphosphoric acid and cyclic polymetaphosphoric acid which are called condensation phosphoric acids. The condensation degree n of these polyphosphoric acids has no special limitation, and is usually 3–50, but is preferably not less than 5 from the point of heat resistance of the resulting melamine polyphosphate addition salts. The melamine polyphosphate addition salts are powders obtained by making a mixture of melamine and polyphosphoric acid into, for example, an aqueous slurry, followed by mixing well to form a reaction product in the form of fine particles, then subjecting the slurry to filtration, washing and drying, and, if necessary, firing the product, and grinding the resulting solid product.

From the points of mechanical strength and appearance of the moldings obtained by molding the composition of the present invention, the melamine polyphosphates used for preparation of the composition are preferably powders having a particle diameter of not more than 100 $\mu$m, more preferably not more than 50 $\mu$m. Particularly, when powders of 0.5–20 $\mu$m are used, not only is a high flame retardancy developed, but also the strength of moldings is considerably increased, and, hence, these are very preferable. The melamine polyphosphates are not necessarily completely pure, and some unreacted melamine or phosphoric acid or polyphosphoric acid may remain therein. Furthermore, melamine polyphosphates containing 10–18% by weight of phosphorus atoms are particularly preferred, because the phenomenon of attachment of contaminants to the molds at the time of the molding operation hardly occurs.

The melamine polyphosphates act as flame-retarding agents and exert very high retardation effects when used in combination with inorganic reinforcing materials such as glass fibers, as compared with triazine-based flame-retarding agents a representative of which is melamine cyanurate. Particularly, when the melamine polyphosphates are added to copolymers comprising polyamide 66 units and polyamide 6I units or mixed polyamides containing polyamide 66 and polyamide 6I, conspicuously high retardation effects are exerted.

<Component (c)>

As the inorganic reinforcing materials used in the present invention, mention may be made of fibrous, particulate, platy or acicular inorganic reinforcing materials such as glass fibers, carbon fibers, potassium titanate fibers, gypsum fibers, brass fibers, stainless steel fibers, steel fibers, ceramic fibers, boron whisker fibers, mica, talc, silica, calcium carbonate, kaolin, calcined kaolin, wollastonite, glass beads, glass flakes, titanium oxide, etc. These reinforcing materials may also be used in a combination of two or more. Among them, especially preferred are glass fibers, wollastonite, talc, calcined kaolin and mica. The glass fibers can be selected from roving of long fiber type, chopped strands and milled fibers of short fiber type, and the like. The glass fibers are preferably surface treated for polyamides.

<Component (d)>

In the present invention, polyalkylene polyhydric alcohols and fatty acid ester derivatives thereof show action and effect as tenacity improving agents. The polyalkylene polyhydric alcohols include dihydric alcohols such as polyethylene glycol, polypropylene glycol, polybutylene glycol, etc., trihydric alcohols such as sorbitan, glycerin, etc., and the like. The fatty acid ester derivatives of the polyalkylene polyhydric alcohols include mono-, di- or triester derivatives of the above polyhydric alcohols with higher fatty acids such as capric acid, lauric acid, myristic acid, palmitic acid, stearic acid, behenic acid, cerotic acid, montanic acid, melissic acid, oleic acid, erucic acid, etc., and the like.

Specific examples of the component (d) are polyethylene glycol monolaurate, polyethylene glycol monostearate, polyethylene glycol monoeruate, polyethylene glycol distearate, ethylene glycol distearate, propylene glycol monostearate, polyoxyethylene bisphenol A laurate, pentaerythritol monooleate, pentaerythritol monostearate, sorbitan monolaurate, sorbitan monopalmitate, sorbitan monostearate, sorbitan tristearate, sorbitan monooleate, sorbitan trioleate, sorbitan distearate, sorbitan monobehenate, polyoxyethylene sorbitan monolaurate, polyoxyethylene sorbitan monopalmitate, polyoxyethylene sorbitan monostearate, polyoxyethylene tristearate, polyoxyethylene sorbitan monooleate, polyoxyethylene sorbitan trioleate, stearic acid monoglyceride, palmitic acid monoglyceride, oleic acid monoglyceride, behenic acid monoglyceride, capric acid monoglyceride, stearic acid diglyceride, palmitic acid diglyceride, oleic acid diglyceride, behenic acid diglyceride, capric acid diglyceride, capric acid triglyceride, etc.

Especially preferred are polyethylene glycol, polypropylene glycol, polybutylene glycol, polyethylene glycol monolaurate, polyethylene glycol monostearate, polyethylene glycol monoeruate and polyethylene glycol distearate which exert high action and effect for improvement of tenacity without causing deterioration of flame retardancy and are industrially easily available.

<Component (e)>

The bisamide compounds in the present invention are obtained through a reaction of an acid and a diamine, and exert action and effect as moldability improving agents for further remarkable improvement of releasability at molding without causing deterioration of flame retardancy. Specific examples of the bisamide compounds are saturated fatty acid bisamides such as methylenebisstearic acid amide, ethylenebiscapric acid amide, ethylenebislauric acid amide, ethylenebisstearic acid amide, ethylenebisisostearic acid amide, ethylenebishydroxystearic acid amide, ethylenebisbehenic acid amide, hexamethylenebisstearic acid amide, hexamethylenebisbehenic acid amide, hexamethylenebishydroxystearic acid amide, etc., unsaturated fatty acid bisamides such as ethylenebisoleic acid amide, hexamethylenebisoleic acid amide, etc., and aromatic bisamides such as m-xylylenebisstearic acid amide, etc. Especially preferred are methylenebisstearic acid amide, ethylenebiscapric acid amide, ethylenebisstearic acid amide, ethylenebisisostearic acid amide, ethylenebisbehenic acid amide, hexamethylenebisstearic acid amide and hexamethylenebisbehenic acid amide which are higher fatty acid bisamides which hardly generate gases during molding and cause no mold deposition phenomena.

<Component (f)>

The metal oxides and metal molybdates of the present invention have the action and effect as metal corrosion inhibitors, particularly, the action and effect to prevent occurrence of corrosion phenomenon in the mold even if molding is carried out for a long period of time under high-temperature molding conditions.

The metal oxides include alkaline earth metal oxides such as beryllium oxide, magnesium oxide, calcium oxide, strontium oxide, barium oxide, radium oxide, aluminum oxide, zinc oxide, etc. From the point of not deteriorating the flame retardancy, beryllium oxide, magnesium oxide, calcium oxide, strontium oxide and barium oxide are preferred, and calcium oxide is especially preferred.

The molybdates include ammonium molybdate, potassium molybdate, calcium molybdate, sodium molybdate and lithium molybdate, and alkaline earth metal molybdates which exert high metal corrosion inhibition effect are preferred, among which calcium molybdate, barium molybdate and strontium molybdate are especially preferred.

<Component (g)>

The metal salts of higher fatty acids having 10–25 carbon atoms used in the present invention have an effect as releasability improving agents at molding and, in addition, an effect to inhibit the mold deposition phenomenon at molding.

Examples of the metal salts of higher fatty acids having 10–25 carbon atoms are sodium salts, lithium salts, calcium salts, magnesium salts, zinc salts, aluminum salts, etc. of higher fatty carboxylic acids such as lauric acid, myristic acid, palmitic acid, stearic acid, behenic acid, cerotic acid, oleic acid, erucic acid, etc. Preferred are calcium salts, magnesium salts, zinc salts and aluminum salts of higher fatty carboxylic acids having 10–25 carbon atoms. Metal salts of fatty acids having less than 10 carbon atoms are insufficient in the effect to improve releasability at molding and, besides, insufficient in the effect to inhibit the bleed-out phenomenon. Moreover, use of the metal salts of higher fatty acids having more than 25 carbon atoms causes deterioration of flame retardancy. Of these metal salts of higher fatty acids, metal salts of stearic acid, specifically, calcium stearate, magnesium stearate, zinc stearate, and aluminum stearate are most preferred because they do not deteriorate flame retardancy of the resulting polyamide resin compositions, highly improve releasability at molding, and can inhibit the bleed-out phenomenon.

<Proportion of Each Component>

In the polyamide resin composition of the present invention, it is preferred that the proportion of the components (a), (b), (c), (d), (e), (f) and (g) is as shown below when the percentage by weight of each of the components (a)–(g) is indicated by A, B, C, D, E, F and G% by weight:

$30 \leq A \leq 70$ $10 \leq B \leq 38$ $5 \leq C \leq 50$ $0 \leq D \leq 5$ $0 \leq E \leq 5$ $0 \leq F \leq 5$ $0 \leq G \leq 5$ $1.5 \leq A/B \leq 3.5$ $A+B+C+D+E+F+G=100$ That is, the proportion of the half-aromatic polyamide resin is preferably in the range of 30–70% by weight. If it is less than 30% by weight, molding processability and mechanical properties are damaged, and if it is more than 70% by weight, there is the possibility of deterioration in flame retardancy and stiffness.

The proportion of the melamine polyphosphates is preferably 10–38% by weight, more preferably 15–35% by weight. If the amount of the melamine polyphosphates is less than 10% by weight, the flame retarding effect is insufficient, and if it is more than 38% by weight, there occur problems such as generation of decomposition gases at kneading and deposition of contaminants on the molds at molding. Furthermore, there are caused serious deterioration of mechanical properties and deterioration in the appearance of moldings.

The ratio A/B of the amounts of the half-aromatic polyamide resin and the melamine polyphosphate is preferably in the range of 1.5–3.5. When A/B is in this range, electric characteristics, particularly, tracking resistance and mechanical strength are improved, and, besides, excellent flame retarding performance can be stably obtained. An especially preferable range of A/B is 1.7–2.5.

Similarly, the proportion of the inorganic reinforcing materials is preferably 5–50% by weight, more preferably 10–40% by weight. If it is less than 5% by weight, development of mechanical strength and stiffness is not recognized, and if it exceeds 50% by weight, not only is the molding processability at extruding or injection molding considerably deteriorated, but also the effect to improve properties based on the amount is not recognized.

In the present invention, the polyalkylene polyhydric alcohol and/or fatty acid ester derivative thereof as the component (d) are not necessarily needed, but when they are added in an amount of preferably at most 5% by weight, more preferably 0.01–5% by weight with request to the polyamide resin composition, the mechanical characteristics of the resin composition are improved, particularly, deflection in bending is increased and molding materials excellent in tenacity can be obtained. If the amount exceeds 5% by weight, not only is the improving effect saturated, but also gases are generated at molding or silver streaks are apt to occur on the surface of moldings, and if it is less than 0.01% by weight, the effect to improve mechanical characteristics cannot be sufficiently exhibited.

The bisamide compound as the component (e) is also not necessarily needed in the present invention, but when it is added in the range of preferably at most 5% by weight, more preferably 0.01–5% by weight with request to the polyamide resin composition, the moldability of the resin composition can be improved, and it has the effect to enhance the releasability of moldings from molds, and has a surprising action and effect to extremely improve the moldability of thin-wall portions. If the amount exceeds 5% by weight, much gas is generated during the molding operation, and if it is less than 0.01% by weight, the effect to improve the releasability cannot be sufficiently exhibited.

The metal oxide and/or the molybdate as the component (f) are also not necessarily needed in the present invention, but when it is added in the range of preferably at most 5% by weight, more preferably 0.01–5% by weight with request to the polyamide resin composition, corrosion of the mold during high-temperature molding can be inhibited and the phenomenon of mold corrosion is not recognized even after molding for a long period of time. If the amount exceeds 5% by weight, the flame retardancy is sometimes adversely affected, and if it is less than 0.01% by weight, the effect to improve corrosiveness is insufficient.

Furthermore, in the present invention, when the metal salts of higher fatty acids having 10–25 carbon atoms as the component (g) which are not essential are added in an amount of preferably up to 5% by weight, more preferably 0.01–5% by weight, releasability at molding can be improved and further the bleed-out phenomenon does not occur. If the amount exceeds 5% by weight, not only the flame retardancy is adversely affected, but also gases are generated at molding to cause sometimes deterioration of processability, and if the amount is less than 0.01% by weight, the effect to improve releasability at molding is insufficient.

<Other Components>

In the present invention, inorganic flame retarding assistants can further be added as far as the mechanical properties or molding processability are not adversely affected. Examples of preferred flame retarding assistants are magnesium hydroxide, aluminum hydroxide, zinc sulfide, iron oxide, boron oxide, zinc borate, etc.

As far as the object of the present invention is not adversely affected, other components, for example, coloring agents such as pigments and dyes, copper-based heat stabilizers which are general heat stabilizers for polyamide resins (for example, copper iodide, copper acetate or the like in combination with potassium iodide or potassium bromide), organic heat resisting agents represented by hindered phenol type oxidative deterioration inhibitors, weathering resistance improving agents, nucleating agents, plasticizing agents, antistatic agents, etc. can be added to the flame retardant polyamide resin composition of the present invention.

<Process for Production of Polyamide Resin Composition and Uses>

The process for producing the reinforced flame retardant polyamide resin composition of the present invention has no special limitation, and the process may be one which comprises melt kneading the above-mentioned polyamide resin, melamine polyphosphate and inorganic filler, and, if necessary, polyalkylene polyhydric alcohol and/or fatty acid ester thereof, bisamide compound, metal oxide and/or molybdate, metal salt of higher fatty acid having 10–25 carbon atoms, etc. by a kneading machine such as a usual single-screw or twin-screw extruder or a kneader at a temperature of 200–350° C.

According to a preferred process for production of the composition, a twin-screw extruder provided with side feed openings at two or more positions is used, and at least the half-aromatic polyamide resin (a) is fed from the feed opening provided at the top position of the twin-screw extruder, and the melamine polyphosphate (b) and the inorganic reinforcing material (c) are fed from any one of the feed openings, followed by kneading them. This process can attain high productivity and is preferred. According to an especially preferred process, a twin-screw extruder having a ratio of the total barrel length L and the barrel diameter D (L/D) of at least 40 and provided with side feed openings at two or more positions is used, and the polyamide resin is fed from a feed opening (A) provided at the top position of the extruder, the melamine polyphosphate is fed from a side feed opening (B) provided at the position downstream from 1/3 of the total barrel length, the inorganic reinforcing material is fed from a side feed opening (C) provided at the position further downstream from the side feed opening (B), and other components are fed from any one of the feed openings, followed by melt kneading them. By employing the above process, flame retardant polyamide resin compositions further excellent in strength and stiffness can be efficiently obtained. An especially preferred process will be specifically explained below.

As the extruder, preferred is a twin-screw extruder having a ratio of the total barrel length L and the barrel diameter D (L/D) of not less than 40 and provided with side feed openings at two or more positions. If the L/D is less than 40, the polyamide resin can hardly be sufficiently heated before reaching the position of feeding of the melamine polyphosphate and the position of feeding of the inorganic reinforcing material, and, thus, the melamine polyphosphate and the inorganic reinforcing material are sometimes fed while the polyamide resin is in unmolten state or in the state of high melt viscosity. If the melamine polyphosphate and the inorganic reinforcing material are fed to the polyamide resin in this state, decomposition or foaming phenomenon of the melamine polyphosphate is caused by the high shearing force, and, as a result, it becomes difficult to obtain a composition having stable flame retardancy, or breakage of the inorganic reinforcing material becomes serious, and it becomes difficult to obtain a composition excellent in strength and stiffness. In order to plasticize the polyamide resin into the state of sufficiently low melt viscosity by an extruder having a small L/D of less than 40, there are methods of raising of the heater temperature, generation of heat by shearing force employing a screw construction with use of many kneading blocks, etc. However, these methods are low in energetic efficiency or have the possibility of causing deterioration of the polyamide resin due to the local heating of the polyamide resin. Furthermore, the extruder used is preferably a co-rotating twin-screw extruder from the points of easiness in screw construction, dispersibility of the melamine polyphosphate and inhibition of breakage of the inorganic reinforcing material. Single-screw extruders require longer retention time and larger distribution of retention time than twin-screw extruders, which sometimes result in decomposition of the melamine polyphosphate or breakage of the inorganic reinforcing material. Moreover, counter-rotating twin-screw extruders are greater in shearing force between the screws, and the inorganic reinforcing material is apt to be broken, and, thus, use of the co-rotating twin-screw extruders is preferred. The polyamide resin is fed from the feed opening (A) provided at the top position of the twin-screw extruder, and the melamine polyphosphate and the inorganic reinforcing material are independently fed from the feed openings (B) and (C) provided at the position downstream from the feed opening (A), but the melamine polyphosphate is preferably fed from the feed opening (B) positioned downstream from 1/3 of the total barrel length. If the feeding position of the melamine polyphosphate is upstream from 1/3 of the total barrel length, the polyamide resin is apt to be in solid state or half-molten state at the feeding position of the melamine polyphosphate, causing application of a large shearing force to the melamine polyphosphate fed to the extruder to result in decomposition and foaming of the flame-retarding agent, and, sometimes, it becomes difficult to obtain compositions having a stable flame retardancy. If the melamine polyphosphate is fed together with the polyamide resin from the feed opening (A) provided at the top position, the frame-retarding agent is apt to deposit at the feed opening, and for avoiding the deposition, the feeding amount of the flame-retarding agent per unit time must sometimes be reduced. Therefore, extrusion productivity is deteriorated, and furthermore there is the possibility of the flame-retarding agent being decomposed or foamed or the polyamide resin being colored because of retention for a long time in the extruder. The especially preferred melting state of the polyamide resin at the feeding position of the melamine polyphosphate is such that the melt viscosity of the polyamide resin is not higher than 200 Pa·s measured at the melting temperature of the polyamide resin at the feeding position of the melamine polyphosphate under a shear rate of 1000/sec. The method for attaining such a melting state of the polyamide resin has no particular limitation, and there is a method of raising the temperature of the heater on the upstream side than the feeding position of the melamine polyphosphate within the temperature range of not causing deterioration of the polyamide resin or a method of providing a kneading block at the screw of the extruder and bringing about the shearing heat generation. In addition, it can be attained by properly adjusting the molecular weight of the polyamide resin used. The melt viscosity of polyamide resin here is a value obtained by conducting a measurement with a capillary viscometer using two or more orifices different in the ratio of orifice diameter and orifice length and making correction with respect to the tube length. Further, the feed opening (C) for the inorganic reinforcing material is preferably positioned downstream from the feed opening (B) for the melamine polyphosphate. When the inorganic reinforcing material is fed to the polyamide resin at the position upstream the feeding of the melamine polyphosphate or the inorganic reinforcing material is fed to the polyamide resin together with the melamine polyphosphate at the same position as for the melamine polyphosphate, a high shearing force is apt to be applied to the inorganic reinforcing material and the breakage of the inorganic reinforcing material is apt to become serious. More preferred is a method according to which gas components generated are removed under a reduced pressure in the range of −13.3 kPa to −101.08 kPa from a vent hole provided at the position further downstream from the feed opening (C) for the inorganic reinforcing material. The generated gas components here are water vapor, air and volatile components such as remaining monomers and additives accompanying during feeding of the polyamide resin, the melamine polyphosphate and the inorganic reinforcing material. If the removal of the generated gas components under reduced pressure is insufficient, the ropes comprising the flame retardant reinforced polyamide resin composition discharged from the extruder are foamed and readily broken, which sometimes cause problems in production. The screw construction of the twin-screw extruder has no special limitations as far as a shearing force enough to plasticize the polyamide resin is given on the upstream side from the melamine polyphosphate feeding position, but it is usually preferred to provide a left-handed screw element at one or more positions on the upstream side from the melamine polyphosphate feeding position. In case they are on the downstream side from the melamine polyphosphate feeding position, it is preferred to take care not so as to apply too large shearing force to the melamine polyphosphate or the inorganic reinforcing material. Specifically, it is preferred to optionally dispose usual right-handed screw elements left-handed screw elements, neutral kneading blocks, blocks comprising right-handed screw elements having notches at the flight portion, etc.

The compositions of the present invention are molded into various moldings for electric, electronic and automobile uses such as connectors, coil bobbins, breakers, electromagnetic switches, holders, plugs, switches, etc. by known methods such as injection molding, extrusion molding, blow molding, etc.

EXAMPLES

The present invention will be explained in more detail by the following examples, which do not limit the present invention. Starting materials and measuring methods used in the examples and comparative examples are shown below.

[Starting Materials]

(A) Polyamide resins (a-1): Polyamide 66/6I (85/15) copolymer 2.00 Kg of an equimolar salt of adipic acid and hexamethylenediamine, 0.35 kg of an equimolar salt of isophthalic acid and hexamethylenediamine, 0.1 kg of adipic acid and 2.5 kg of pure water were charged in an autoclave of 5 L, followed by vigorous stirring. After sufficient replacement with nitrogen, the temperature was raised from room temperature to 220° C. over about 1 hour with stirring. In this case, the internal pressure of the autoclave reached 1.76 MPa in gauge pressure due to spontaneous pressure of water vapor in the autoclave, and the heating was continued while removing water out of the reaction system so as not to reach a pressure higher than 1.76 MPa. Furthermore, when the internal temperature reached 260° C. after a lapse of 2 hours, the heating was stopped, and the valve of the autoclave was closed and the content was cooled to room temperature over about 8 hours. After the cooling, the autoclave was opened, and about 2 kg of a polymer was taken out and ground. The resulting ground polymer was charged in an evaporator of 10 L and subjected to solid phase polymerization at 200° C. for 10 hours in a nitrogen stream. The polyamide (a-1) obtained by the solid phase polymerization had a melting point of 245° C. and a sulfuric acid relative viscosity of 2.38.

(a-2): Polyamide 66/6I (80/20) copolymer

Polyamide (a-2) was prepared in the same manner as in the above polymerization example 1, except that 2.00 kg of an equimolar salt of adipic acid and hexamethylenediamine, 0.50 kg of an equimolar salt of isophthalic acid and hexamethylenediamine, 0.1 kg of adipic acid and 2.5 kg of pure water were used as the starting materials. The resulting polyamide (a-2) had a melting point of 239° C. and a sulfuric acid relative viscosity of 2.41.

(a-3): Polyamide 66/6I (65/35) copolymer

Polyamide (a-3) was prepared in the same manner as in the polymerization example 1, except that 1.67 kg of an equimolar salt of adipic acid and hexamethylenediamine, 0.88 kg of an equimolar salt of isophthalic acid and hexamethylenediamine, 0.1 kg of adipic acid and 2.5 kg of pure water were used as the starting materials. The resulting polyamide (a-3) had a melting point of 219° C. and a sulfuric acid relative viscosity of 2.45.

(a-4): Polyamide 6T/6I (40/60) copolymer 0.67 Kg of an equimolar salt of terephthalic acid and hexamethylenediamine, 1.0 kg of an equimolar salt of isophthalic acid and hexamethylenediamine, 0.05 kg of adipic acid and 2.5 kg of pure water were charged in an autoclave of 5 L, followed by vigorous stirring. After sufficient replacement with nitrogen, the temperature was raised from room temperature to 220° C. over about 1 hour with stirring. In this case, the internal pressure of the autoclave reached 1.76 MPa in gauge pressure due to the spontaneous pressure of water vapor in the autoclave, and the heating was continued while removing water out of the reaction system so as not to reach a pressure higher than 1.76 MPa. Furthermore, when the internal temperature reached 270° C. after a lapse of 2.5 hours, the heating was stopped, and the valve of the autoclave was closed and the content was cooled to room temperature over about 9 hours. After the cooling, the autoclave was opened, and about 1.5 kg of a polymer was taken out and ground. The resulting ground polymer was charged in an evaporator of 10 L and subjected to solid phase polymerization at 200° C. for 10 hours in a nitrogen stream. The polyamide (a-4) obtained by the solid phase polymerization had a melting point of 255° C. and a sulfuric acid relative viscosity of 2.28.

(a-5): Polyamide 66

Trade name Leona 1300 manufactured by Asahi Kasei Kogyo K. K.

(a-6): Polyamide 6

Trade name SF1013A manufactured by Ube Industries, Ltd.

(B) Flame-retarding agents (b-1): Melamine polyphosphate

Trade name Apinon MPP-A manufactured by Sanwa Chemical Co., Ltd.

(b-2): Melamine phosphate

Trade name Apinon P-7202 manufactured by Sanwa Chemical Co., Ltd.

(C) Inorganic reinforcing materials
(c-1): Glass fibers
Trade name CS03JA FT756 manufactured by Asahi Fiber Glass Co., Ltd. (average fiber diameter 10 μm)
(D) Polyhydric alcohols, polyhydric alcohol esters
(d-1): Polyethylene glycol
Trade name MACROGOL 400 manufactured by Sanyo Kasei Co., Ltd.
(d-2): Polyethylene glycol monolaurate
Trade name EMANON 1112 manufactured by Kao Co., Ltd.
(d-3): Polyethylene glycol monostearate
Trade name EMANON 3199 manufactured by Kao Co., Ltd.
(d-4): Polyethylene glycol distearate Trade name EMANON 3299 manufactured by Kao Co., Ltd.
(d-5): Pentaerythritol monostearate
Trade name EXCEPARL PE-MS manufactured by Kao Co., Ltd.
(d-6): Pentaerythritol
Reagent for chemistry manufactured by Katayama Kagaku Kogyo Co., Ltd.
(E) Amide compounds
(e-1): Ethylenebisstearic acid amide
Trade name SLIPAX E manufactured by Nippon Kasei Co., Ltd.
(e-2): Ethylenebislauric acid amide
Trade name SLIPAX L manufactured by Nippon Kasei Co., Ltd.
(e-3): Stearic acid amide
Trade name DIAMID 200 manufactured by Nippon Kasei Co., Ltd.
(F) Metal oxides, metal salts
(f-1): Calcium oxide
First grade reagent manufactured by Katayama Kagaku Kogyo Co., Ltd.
(f-2): Magnesium oxide
First grade reagent manufactured by Katayama Kagaku Kogyo Co., Ltd.
(f-3): Calcium molybdate
First grade reagent manufactured by Katayama Kagaku Kogyo Co., Ltd.
(G) Metal salts of higher fatty acids, esters of higher fatty acids
(g-1): Calcium stearate
Trade name SC-100 manufactured by Sakai Kagaku Kogyo Co., Ltd.
(g-2): Aluminum stearate
Trade name SA-100 manufactured by Sakai Kagaku Kogyo Co., Ltd.
(g-3): Sodium caprylate
First grade reagent manufactured by Wako Jun-yaku Co., Ltd.
(g-4): Sodium montanate
Trade name Licomont Cav102 manufactured by Clariant Japan Co., Ltd.
(g-5): Stearyl stearate
Trade name UNISTAR M-9676 manufactured by Nippon Oil & Fats Co., Ltd.

[Measuring Methods]

(1) Flame retardancy of thin-wall moldings:
This was measured in accordance with the method of UL94 (a standard specified by Underwriters Laboratories Inc. of U.S.A.). The thickness of test pieces was 1/16 inch and 1/32 inch, and the test pieces were molded by an injection molding machine (IS50EP manufactured by Toshiba Machine Co., Ltd.).

(2) Sulfuric acid relative viscosity:
A relative viscosity in 98% sulfuric acid was measured in accordance with JIS K6810.

(3) Mechanical characteristics:
A bend test piece (3 mm thick) of ASTM D790 was molded using an injection molding machine (IS50EP manufactured by Toshiba Machine Co., Ltd.) and subjected to a bend test in accordance with ASTM D790 to obtain bending strength, bending modulus and amount of deflection in bending.

(4) Tracking resistance (CTI):
A flat plate test piece of 130 mm×130 mm×3 mm (thickness) was molded under the conditions of a resin temperature of 280° C. and a mold temperature of 80° C. using an injection molding machine (IS150 manufactured by Toshiba Machine Co., Ltd.). The resulting test piece was set in a tracking resistance testing machine Model HAT-500-3 manufactured by Hitachi Chemical Co., Ltd., and a droplet of a 0.1% aqueous ammonium chloride solution was dropped every 30 seconds under a voltage of 100–600 V and a maximum voltage under which the test piece was not ruptured with no tracking by the dropping of 50 droplets was obtained in accordance with IEC Publication 112 standard. The higher the obtained voltage, the better the tracking resistance.

Figure 1:
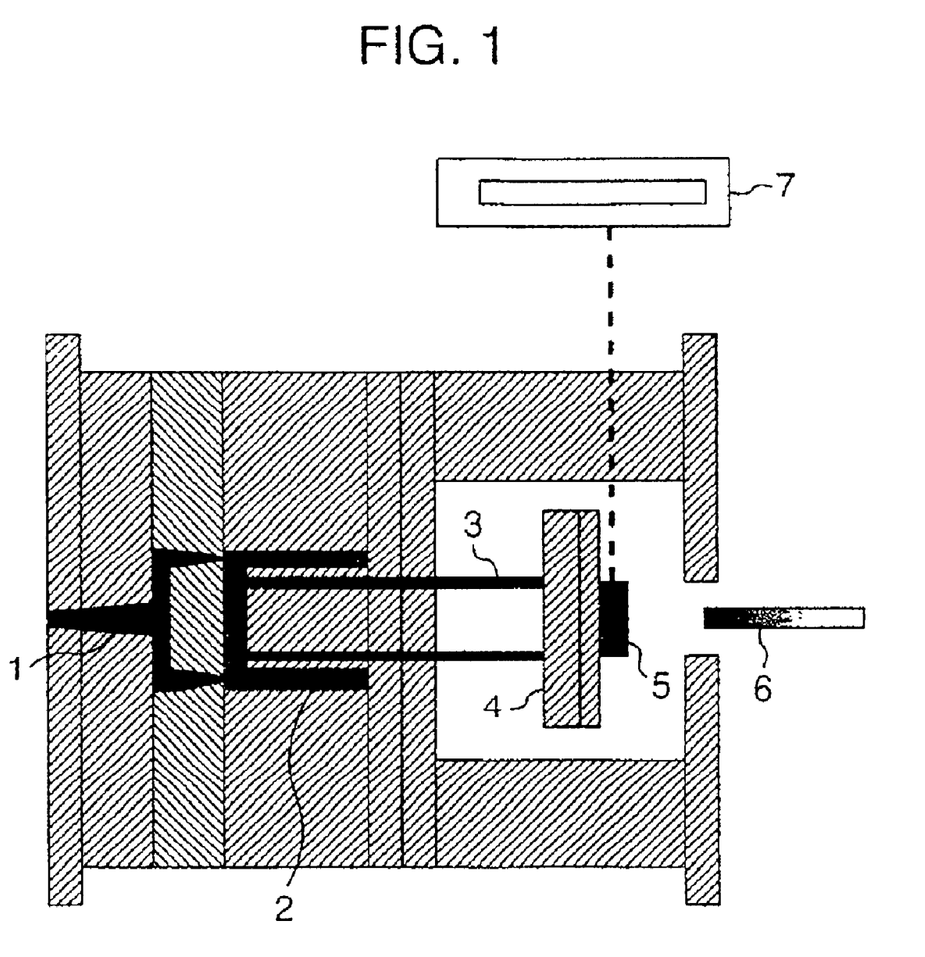
FIG. 1 is a schematic view of a mold used for the measurement of releasability from the mold in the examples given below.

(5) Releasability:
Molding was carried out using a mold provided with the releasing force measuring device shown in FIG. 1 by an injection molding machine (FN3000 manufactured by Nissei Jushi Co., Ltd.) under the conditions of a cylinder temperature of 280° C., a mold temperature of 80° C., and an injection pressure of 39.2 MPa, and an ejection force for ejecting a molding from the mold was measured. The smaller the ejection force, the better the releasability. In the mold shown in FIG. 1, 1 indicates a sprue runner, 2 indicates a cup-shaped molding, 3 indicates an ejector pin, 4 indicates an ejector plate, 5 indicates a pressure sensor, 6 indicates an ejector rod, and 7 indicates a releasing force recorder.

(6) Corrosion of mold metal:
50 Grams of a glass fiber-reinforced polyamide resin pellet and a test piece of 1 cm×2 cm×0.5 cm (thickness) comprising a tool steel alloy for a mold (SKD11) were put in a pressure container made of stainless steel which had a Teflon-coated inner surface and heated at a temperature of 280° C. for 5 hours in a constant temperature oil bath, followed by cooling, and the resin component molten and solidified on the metal test piece was ground and removed. Then, the surface of the test piece was observed by a metallurgical microscope. The degree of corrosion was ranked as follows.

x: Corrosion occurred on the whole surface.
Δ: Light pitting occurred.
○: Substantially no corrosion was seen.

(7) Bleeding:
A molding was left to stand for 240 hours in a thermo-hygrostat adjusted to a temperature of 60° C. and a relative humidity of 95%, and thereafter the bleeding matters precipitated on the surface of the molding was visually observed. The degree of bleeding was judged by the following criteria.

○: No bleeding matters were observed on the surface of the molding.

x: Bleeding matters were seen on the surface of the molding.

(8) Resin temperature at the feeding position of melamine polyphosphate flame-retarding agent:

This was measured by a thermocouple built in the barrel.

(9) Melt viscosity of the resin at the feeding position of melamine polyphosphate flame-retarding agent:

A melt shear viscosity was measured at a shear rate of 1000/sec and at the resin temperature measured in the above (8) using a twin capillary rheometer RH7-2 manufactured by ROSAND Co., Ltd. In this case, two orifices of 1.0 mm in die diameter, 180° in die inlet angle, and 16 and 0.25 in the ratio of orifice length and orifice diameter were used, and correction with respect to the tube length was made to obtain a melt viscosity.

Example 1

In order to obtain a composition comprising 49% by weight of the polyamide resin (a-1), 26% by weight of the flame-retarding agent (b-1) and 25% by weight of the glass fiber (c-1), the polyamide (a-1) and the flame-retarding agent (b-1) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 260° C., a screw rotation rate of 200 rpm, a vent pressure-reduction degree of −53.2 kPa, and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 1.

Example 2

Pellets were obtained in the same manner as in Example 1, except that (a-2) was used as the polyamide resin. Test pieces were molded from the resulting pellets and the various characteristics were determined by the above-mentioned measuring methods. The results are shown in Table 1.

Example 3

Pellets were obtained in the same manner as in Example 1, except that (a-3) was used as the polyamide resin. Test pieces were molded from the resulting pellets and the various characteristics were determined by the above-mentioned measuring methods. The results are shown in Table 1.

Comparative Example 1

Pellets were obtained in the same manner as in Example 1, except that (a-4) was used as the polyamide resin. Test pieces were molded from the resulting pellets and the various characteristics were determined by the above-mentioned measuring methods. The results are shown in Table 1.

Comparative Example 2

Pellets were obtained in the same manner as in Example 1, except that (a-5) was used as the polyamide resin. Test pieces were molded from the resulting pellets and the various characteristics were determined by the above-mentioned measuring methods. The results are shown in Table 1.

Comparative Example 3

Pellets were obtained in the same manner as in Example 1, except that (a-6) was used as the polyamide resin. Test pieces were molded from the resulting pellets and the various characteristics were determined by the above-mentioned measuring methods. The results are shown in Table 1.

Comparative Example 4

Pellets were obtained in the same manner as in Example 1, except that (b-2) was used as the flame-retarding agent. Test pieces were molded from the resulting pellets and the various characteristics were determined by the above-mentioned measuring methods. The results are shown in Table 1.

As can be seen from the results of Examples 1–3 and Comparative Examples 1–4, all of characteristics of thin-wall flame retardancy, electric characteristics and moldability can be satisfied, only when the half-aromatic polyamide containing hexamethylene phthalamide unit and the melamine polyphosphate in specific amounts are used in combination.

Examples 4–5 and Comparative Examples 5–6

Pellets were obtained in the same manner as in Example 1, except that amounts of the polyamide resin (a-2), the flame-retarding agent (b-1) and the glass fiber (c-1) were as shown in Table 1. Test pieces were molded from the resulting pellets and the various characteristics were determined by the above-mentioned measuring methods. The results are shown in Table 1.

TABLE 1

| | | Example 1 | Example 2 | Example 3 | Comparative Example 1 | Comparative Example 2 | Comparative Example 3 | Comparative Example 4 | Example 4 | Example 5 | Comparative Example 5 | Comparative Example 6 |
|---|---|---|---|---|---|---|---|---|---|---|---|---|
| Composition | (a) Polyamide resin Kind | a-1 | a-2 | a-3 | a-4 | a-5 | a-6 | a-1 | a-2 | a-2 | a-52 | a-2 |
| | Amount (wt %) | 49.0 | 49.0 | 49.0 | 49.0 | 49.0 | 49.0 | 49.0 | 58.0 | 41.0 | 51.0 | 35.0 |
| | (b) Flame-retarding agent Kind | b-1 | b-1 | b-1 | b-1 | b-1 | b-1 | b-2 | b-1 | b-1 | b-1 | b-1 |
| | Amount (wt %) | 26.0 | 26.0 | 26.0 | 26.0 | 26.0 | 26.0 | 26.0 | 32.0 | 19.0 | 9.0 | 40.0 |
| | (c) Glass fiber Kind | c-1 | c-1 | c-1 | c-1 | c-1 | c-1 | c-1 | c-1 | c-1 | c-1 | c-1 |
| | Amount (wt %) | 25.0 | 25.0 | 25.0 | 25.0 | 25.0 | 25.0 | 25.0 | 10.0 | 40.0 | 40.0 | 25.0 |
| Characteristics | (a)/(b) mixing ratio | 1.9 | 1.9 | 1.9 | 1.9 | 1.9 | 1.9 | 1.9 | 1.8 | 2.2 | 5.7 | 0.9 |
| | Flame-retardancy (UL94 rank) 1/32 inch | V-0 | V-0 | V-0 | V-2 | V-1 | V-2 | V-1 | V-0 | V-0 | V-2 | V-0 |
| | 1/16 inch | V-0 | V-0 | V-0 | V-1 | V-0 | V-1 | V-0 | V-0 | V-0 | V-2 | V-0 |
| | Bending strength (MPa) | 241 | 238 | 221 | 231 | 243 | 238 | 240 | 184 | 275 | 293 | 179 |
| | Bending modulus (GPa) | 10.4 | 10.6 | 10.1 | 10.7 | 9.8 | 9.6 | 10.3 | 7.5 | 14.3 | 13.6 | 11.3 |
| | Deflection in bending (mm) | 3.6 | 3.5 | 3.3 | 3.2 | 3.7 | 3.8 | 3.1 | 3.2 | 4.3 | 5.5 | 2.8 |
| | CTI (V) | 350 | 350 | 275 | 275 | 350 | 350 | 350 | 325 | 475 | 500 | 250 |
| | Releasability (ejection force) (N) | 28.0 | 28.8 | 35.2 | 39.8 | 28.5 | 32.4 | 28.5 | 29.6 | 25.5 | 28.4 | 33.6 |
| | Corrosion of mold | Δ | Δ | — | — | — | — | X | Δ | Δ | — | — |

Example 6

In order to obtain a composition comprising 47.5% by weight of the polyamide resin (a-2), 26% by weight of the flame-retarding agent (b-1), 25% by weight of the glass fiber (c-1) and 1.5% by weight of the polyhydric alcohol (d-1), the polyamide (a-2), the flame-retarding agent (b-1) and the polyhydric alcohol (d-1) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 260° C., a screw rotation rate of 200 rpm, a vent pressure-reduction degree of −53.2 kPa and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 2.

Examples 7–10

Pellets were obtained in the same manner as in Example 6, except that polyhydric alcohol ester derivatives (d-2), (d-3), (d-4) and (d-5) were used in place of the polyhydric alcohol (d-1). Test pieces were molded from the resulting pellets and the various characteristics were determined by the above-mentioned measuring methods. The results are shown in Table 2.

Example 11

Pellets were obtained in the same manner as in Example 6, except that the polyhydric alcohol (d-6) was used in place of the polyhydric alcohol (d-1). Test pieces were molded from the resulting pellets and the various characteristics were determined by the above-mentioned measuring methods. The results are shown in Table 2.

Examples 12–14

Pellets were obtained in the same manner as in Example 6, except that amounts of the polyamide resin (a-2), the flame-retarding agent (b-1), the glass fiber (c-1) and the polyhydric alcohol ester derivative (d-2) were as shown in Table 2. Test pieces were molded from the resulting pellets and the various characteristics were determined by the above-mentioned measuring methods. The results are shown in Table 2.

TABLE 2

|  |  |  | Example 6 | Example 7 | Example 8 | Example 9 | Example 10 | Example 11 | Example 12 | Example 13 | Example 14 |
|---|---|---|---|---|---|---|---|---|---|---|---|
| Composition | (a) Polyamide resin | Kind | a-2 | a-2 | a-2 | a-2 | a-2 | a-2 | a-2 | a-2 | a-2 |
|  |  | Amount (wt %) | 47.5 | 47.5 | 47.5 | 47.5 | 47.5 | 47.5 | 48.5 | 46.0 | 43.0 |
|  | (b) Flame-retarding agent | Kind | b-1 | b-1 | b-1 | b-1 | b-1 | b-1 | b-1 | b-1 | b-1 |
|  |  | Amount (wt %) | 26.0 | 26.0 | 26.0 | 26.0 | 26.0 | 26.0 | 26.0 | 26.0 | 26.0 |
|  | (c) Glass fiber | Kind | c-1 | c-1 | c-1 | c-1 | c-1 | c-1 | c-1 | c-1 | c-1 |
|  |  | Amount (wt %) | 25.0 | 25.0 | 25.0 | 25.0 | 25.0 | 25.0 | 25.0 | 25.0 | 25.0 |
|  | (d) Polyhydric alcohol or ester derivative thereof | Kind | d-1 | d-2 | d-3 | d-4 | d-5 | d-6 | d-2 | d-2 | d-2 |
|  |  | Amount (wt %) | 1.5 | 1.5 | 1.5 | 1.5 | 1.5 | 1.5 | 0.5 | 3.0 | 6 |
|  | (a)/(b) mixing ratio |  | 1.8 | 1.8 | 1.8 | 1.8 | 1.8 | 1.8 | 1.9 | 1.8 | 1.7 |
| Charateristics | Flame-retardancy (UL94 rank) | 1/32 inch | V-0 | V-0 | V-0 | V-0 | V-0 | V-0 | V-0 | V-0 | V-0 |
|  |  | 1/16 inch | V-0 | V-0 | V-0 | V-0 | V-0 | V-0 | V-0 | V-0 | V-0 |
|  | Bending strength | (MPa) | 238 | 236 | 237 | 238 | 233 | 234 | 234 | 238 | 231 |
|  | Bending modulus | (GPa) | 10.6 | 10.5 | 10.2 | 10.4 | 10.5 | 10.5 | 10.6 | 10.7 | 10.1 |
|  | Deflection in bending | (mm) | 4.1 | 4.6 | 4.6 | 4.5 | 3.9 | 3.6 | 4.1 | 4.7 | 4.8 |
|  | CTI | (V) | 350 | 350 | 350 | 350 | 350 | 350 | 350 | 350 | 350 |
|  | Releasability (ejection force) | (N) | 25.5 | 25.3 | 25.8 | 25.3 | 26.6 | 26.2 | 25.9 | 25.3 | 24.4 (much gas) |
|  | Corrosion of mold |  | Δ | Δ | Δ | Δ | — | — | — | Δ | Δ |

Example 15

In order to obtain a composition comprising 48.9% by weight of the polyamide resin (a-2), 26% by weight of the flame-retarding agent (b-1), 25% by weight of the glass fiber (c-1) and 0.1% by weight of the bisamide compound (e-1), the polyamide (a-2), the flame-retarding agent (b-1) and the bisamide compound (e-1) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 260° C., a screw rotation rate of 200 rpm, a vent pressure-reduction degree of −53.2 kPa and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 3.

Examples 16–18

Pellets were obtained in the same manner as in Example 15, except that amounts of the polyamide resin (a-2), the flame-retarding agent (b-1), the glass fiber (c-1) and the bisamide compound (e-1) were as shown in Table 3. Test pieces were molded from the resulting pellets and the various characteristics were determined by the above-mentioned measuring methods. The results are shown in Table 3.

Example 19

In order to obtain a composition comprising 47.9% by weight of the polyamide resin (a-2), 26% by weight of the flame-retarding agent (b-1), 25% by weight of the glass fiber (c-1), 1.0% by weight of the polyhydric alcohol ester derivative (d-2) and 0.1% by weight of the bisamide compound (e-2), the polyamide (a-2), the flame-retarding agent (b-1), the polyhydric alcohol ester derivative and the bisamide compound (e-2) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 260° C., a screw rotation rate of 200 rpm, a vent pressure-reduction degree of −53.2 kPa and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 3.

Example 20

Pellets were obtained in the same manner as in Example 19, except that amounts of the polyamide resin (a-2), the flame-retarding agent (b-1), the glass fiber (c-1), the polyhydric alcohol ester derivative (d-3) and the bisamide compound (e-2) were as shown in Table 3. Test pieces were molded from the resulting pellets and the various characteristics were determined by the above-mentioned measuring methods. The results are shown in Table 3.

Example 21

Pellets were obtained in the same manner as in Example 16, except that amide compound (e-3) was used in place of the bisamide compound (e-1). Test pieces were molded from the resulting pellets and the various characteristics were determined by the above-mentioned measuring methods. The results are shown in Table 3.

Example 22

In order to obtain a composition comprising 47.5% by weight of the polyamide resin (a-2), 26% by weight of the flame-retarding agent (b-1), 25% by weight of the glass fiber (c-1), 0.5% by weight of the bisamide compound (e-1) and 1.0% by weight of the metal oxide (f-1), the polyamide (a-2), the flame-retarding agent (b-1), the bisamide compound (e-1) and the metal oxide (f-1) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 260° C., a screw rotation rate of 200 rpm, a vent pressure-reduction degree of −53.2 kPa and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 3.

Example 23

Pellets were obtained in the same manner as in Example 22, except that the metal oxide (f-2) was used in place of the metal oxide (f-1). Test pieces were molded from the resulting pellets and the various characteristics were determined by the above-mentioned measuring methods. The results are shown in Table 3.

Example 24

In order to obtain a composition comprising 46.5% by weight of the polyamide resin (a-2), 26% by weight of the flame-retarding agent (b-1), 25% by weight of the glass fiber (c-1), 1.0% by weight of the polyhydric alcohol ester derivative (d-2), 0.5% by weight of the bisamide compound (e-1) and 1% by weight of the metal salt (f-3), the polyamide (a-2), the flame-retarding agent (b-1), the polyhydric alcohol ester derivative (d-2), the bisamide compound (e-1) and the metal salt (f-3) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 260° C., a screw rotation rate of 200 rpm, a vent pressure-reduction degree of −53.2 kPa and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 3.

TABLE 3

| | | | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
| Composition | (a) Polyamide resin | Kind | a-2 | a-2 | a-2 | a-2 | a-2 | a-2 | a-2 | a-2 | a-2 | a-2 |
| | | Amount (wt %) | 48.9 | 48.5 | 48.0 | 43.0 | 47.9 | 47.5 | 48.5 | 47.5 | 47.5 | 46.5 |
| | (b) Flame-retarding agent | Kind | b-1 | b-1 | b-1 | b-1 | b-1 | b-1 | b-1 | b-1 | b-1 | b-1 |
| | | Amount (wt %) | 26.0 | 26.0 | 26.0 | 26.0 | 26.0 | 26.0 | 26.0 | 26.0 | 26.0 | 26.0 |
| | (c) Glass fiber | Kind | c-1 | c-1 | c-1 | c-1 | c-1 | c-1 | c-1 | c-1 | c-1 | c-1 |
| | | Amount (wt %) | 25.0 | 25.0 | 25.0 | 25.0 | 25.0 | 25.0 | 25.0 | 25.0 | 25.0 | 25.0 |
| | (d) Ester derivative of polyhydric alcohol | Kind | — | — | — | — | d-2 | d-3 | — | — | — | d-2 |
| | | Amount (wt %) | — | — | — | — | 1.0 | 1.0 | — | — | — | 1.0 |
| | (e) Amide compound | Kind | e-1 | e-1 | e-1 | e-1 | e-1 | e-1 | e-1 | e-1 | e-1 | e-1 |
| | | Amount (wt %) | 0.1 | 0.5 | 1.0 | 6.0 | 0.1 | 0.5 | 0.5 | 0.5 | 0.5 | 0.5 |

TABLE 3-continued

|  |  |  | Example 15 | Example 16 | Example 17 | Example 18 | Example 19 | Example 20 | Example 21 | Example 22 | Example 23 | Example 24 |
|---|---|---|---|---|---|---|---|---|---|---|---|---|
|  | (f) Oxide or metal salt | Kind | — | — | — | — | — | — | — | f-1 | f-2 | f-3 |
|  |  | Amount (wt %) | — | — | — | — | — | — | — | 1.0 | 1.0 | 1.0 |
|  | (a) / (b) mixing ratio |  | 1.9 | 1.9 | 1.8 | 1.7 | 1.8 | 1.8 | 1.9 | 1.8 | 1.8 | 1.8 |
| Characteristics | Flame-retardancy | 1/32 inch | V-0 | V-0 | V-0 | V-0 | V-0 | V-0 | V-0 | V-0 | V-0 | V-0 |
|  | (UL94 rank) | 1/16 inch | V-0 | V-0 | V-0 | V-0 | V-0 | V-0 | V-0 | V-0 | V-0 | V-0 |
|  | Bending strength | (MPa) | 238 | 236 | 232 | 229 | 239 | 236 | 234 | 235 | 235 | 235 |
|  | Bending modulus | (GPa) | 10.6 | 10.5 | 10.2 | 10.4 | 10.5 | 10.5 | 10.6 | 10.7 | 10.7 | 10.7 |
|  | Deflection in bending | (mm) | 3.5 | 3.5 | 3.5 | 3.3 | 4.3 | 4.6 | 3.4 | 3.4 | 3.4 | 4.6 |
|  | CTI | (V) | 350 | 350 | 350 | 350 | 350 | 350 | 350 | 375 | 375 | 375 |
|  | Releasability (ejection force) | (N) | 26.0 | 23.5 | 21.3 | 22.0 (much gas) | 26.6 | 24.1 | 29.1 | 22.4 | 24.4 | 23.8 |
|  | Corrosion of mold |  | Δ | Δ | — | — | — | Δ | Δ | ◯ | ◯ | ◯ |

Example 25

In order to obtain a composition comprising 49.8% by weight of the polyamide resin (a-1), 25.0% by weight of the flame-retarding agent (b-1), 25% by weight of the glass fiber (c-1), and 0.2% by weight of the metal salt of higher fatty acid (g-1), the polyamide (a-1), the flame-retarding agent (b-1) and the metal salt of higher fatty acid (g-1) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 240° C., a screw rotation rate of 100 rpm, a vent pressure-reduction degree of −53.2 kPa and a throughput rate of 30 kg/hr. After cooling, the strands were granulated by a cutter to obtain pellets of polyamide resin composition. Test pieces were molded from the resulting pellets and the various characteristics were determined by the above-mentioned measuring methods. The results are shown in Table 4.

Example 26

Pellets were obtained in the same manner as in Example 25, except that (a-2) was used as the polyamide resin. Test pieces were molded from the resulting pellets and the various characteristics were determined by the above-mentioned measuring methods. The results are shown in Table 4.

Example 27

Pellets were obtained in the same manner as in Example 25, except that (a-3) was used as the polyamide resin. Test pieces were molded from the resulting pellets and the various characteristics were determined by the above-mentioned measuring methods. The results are shown in Table 4.

Example 28

In order to obtain a composition comprising 49.0% by weight of the polyamide resin (a-2), 25.0% by weight of the flame-retarding agent (b-1), 25.0% by weight of the glass fiber (c-1), and 1.0% by weight of the metal salt of higher fatty acid (g-1), the polyamide (a-2), the flame-retarding agent (b-1) and the metal salt of higher fatty acid (g-1) were top-fed and the glass fiber (c-1) was side-fed from a feed opening provided at the position of 0.68 of the total length of the extruder, and these were kneaded and taken out in the form of a strand using a co-rotating twin-screw extruder (TEM35 manufactured by Toshiba Machine Co., Ltd.) having an L/D of 47 under the conditions of a cylinder preset temperature of 240° C., a screw rotation rate of 100 rpm, a vent pressure-reduction degree of −53.2 kPa and a throughput rate of 30 kg/hr. After cooling, the strands were granulated by a cutter to obtain pellets of polyamide resin composition. Various characteristics of the resulting pellets were determined by the above-mentioned measuring methods. The results are shown in Table 4.

Example 29

Pellets were obtained in the same manner as in Example 28, except that (g-2) was used as the metal salt of higher fatty acid, and the amounts were as shown in Table 4, and various characteristics were determined. The results are shown in Table 4.

Example 30

Pellets were obtained in the same manner as in Example 28, except that the amount of the metal salt of higher fatty acid was 0, and the amounts of the polyamide resin (a-2), the flame-retarding agent (b-1) and the glass fiber (c-1) were as shown in Table 4, and various characteristics were determined. The results are shown in Table 4.

Example 31

Pellets were obtained in the same manner as in Example 28, except that (g-3) was used as the metal salt of higher fatty acid, and the amounts were as shown in Table 4, and various characteristics were determined. The results are shown in Table 4.

Example 32

Pellets were obtained in the same manner as in Example 28, except that (g-4) was used as the metal salt of higher fatty acid, and the amounts were as shown in Table 4, and various characteristics were determined. The results are shown in Table 4.

Example 33

Pellets were obtained in the same manner as in Example 28, except that (g-5) was used as the metal salt of higher fatty acid, and the amounts were as shown in Table 4, and various characteristics were determined. The results are shown in Table 4.

TABLE 4

| | | | Example 25 | Example 26 | Example 27 | Example 28 | Example 29 | Example 30 | Example 31 | Example 32 | Example 33 |
|---|---|---|---|---|---|---|---|---|---|---|---|
| Composition | (a) Polyamide resin | Kind | a-1 | a-2 | a-3 | a-2 | a-2 | a-2 | a-2 | a-2 | a-2 |
| | | Amount (wt %) | 49.8 | 49.8 | 49.8 | 49.0 | 49.8 | 50.0 | 49.8 | 49.8 | 49.8 |
| | (b) Flame-retarding agent | Kind | b-1 | b-1 | b-1 | b-1 | b-1 | b-1 | b-1 | b-1 | b-1 |
| | (wt %) | Amount | 25.0 | 25.0 | 25.0 | 25.0 | 25.0 | 25.0 | 25.0 | 25.0 | 25.0 |
| | (c) Glass fiber | Kind | c-1 | c-1 | c-1 | c-1 | c-1 | c-1 | c-1 | c-1 | c-1 |
| | | Amount (wt %) | 25.0 | 25.0 | 25.0 | 25.0 | 25.0 | 25.0 | 25.0 | 25.0 | 25.0 |
| | (g) Metal salt of higher fatty acid (wt %) | Kind | g-1 | g-1 | g-1 | g-1 | g-2 | — | g-3 | g-4 | g-5 |
| | | Amount | 0.2 | 0.2 | 0.2 | 1.0 | 0.2 | 0 | 0.2 | 0.2 | 0.2 |
| Characteristics | Thin-wall flame retardancy UL94 (1/32 inch) | Rank | — | V-0 | V-0 | V-0 | V-0 | V-0 | V-0 | V-0 | V-1 | V-1 |
| | | Average burning time | second | 1.2 | 0.9 | 0.7 | 3.2 | 1.1 | 0.7 | 0.9 | 6.8 | 15.8 |
| | | Ignition of cotton | — | No | No | No | No | No | No | No | No | No |
| | Bending strength | (MPa) | 241 | 238 | 221 | 232 | 239 | 237 | 238 | 236 | 232 |
| | Bending modulus | (Ga) | 10.4 | 10.6 | 10.1 | 10.2 | 10.5 | 10.5 | 10.4 | 10.3 | 10.4 |
| | Releasability (ejection force) | (N) | 28.0 | 28.8 | 35.2 | 24.2 | 29.8 | 40.2 | 38.7 | 25.3 | 21.5 |
| | Bleeding | — | ○ | ○ | ○ | ○ | ○ | x | x | ○ | ○ |

Example 34

Using a co-rotating twin-screw extruder (TEM35 manufactured by Toshiba Machine Co., Ltd.) having an L/D of 47, the polyamide resin (a-1) was top-fed from a feed opening (A) provided at the top position of the extruder at 29.4 kg/hr using a gravimetric feeder, the flame-retarding agent (b-1) was side-fed from a feed opening (B) provided at the position of 0.5 of the total length of the extruder (in the case of the highest upstream being 0 and the lowest downstream being 1) at 15.6 kg/hr using a gravimetric feeder, and the glass fiber (c-1) was side-fed from a feed opening (C) provided at the position of 0.68 of the total length of the extruder which was further downstream from the opening (B) at 15.0 kg/hr using a gravimetric feeder, and these were melt kneaded and taken out in the form of a rope under the conditions of a cylinder preset temperature of 260° C., a screw rotation rate of 200 rpm, a vent pressure-reduction degree of −53.2 kPa and a throughput rate of 60 kg/hr. After cooling, the ropes were granulated by a cutter to obtain pellets of polyamide resin composition. The resulting pellets were subjected to determination of various characteristics by the above-mentioned measuring methods. The results are shown in Table 5.

Example 35

Pellets were obtained in the same manner as in Example 34, except that the vent pressure-reduction degree was 0 kPa, namely, deaeration was not carried out. The stability of the resulting ropes was somewhat inferior to that of the ropes in Example 34, but the physical properties and the flame retardancy were good. The results are shown in Table 5.

Example 36

Using a co-rotating twin-screw extruder (TEM35 manufactured by Toshiba Machine Co., Ltd.) having an L/D of 47, the polyamide resin (a-1) and the flame-retarding agent (b-1) were top-fed from a feed opening (A) provided at the top position of the extruder at 14.7 kg/hr and 7.8 kg/hr, respectively, using gravimetric feeders, and the glass fiber (c-1) was side-fed from a feed opening (C) provided at the position of 0.68 of the total length of the extruder at 7.5 kg/hr using a gravimetric feeder, and these were melt kneaded and taken out in the form of a rope under the conditions of a cylinder preset temperature of 260° C., a screw rotation rate of 200 rpm, a vent pressure-reduction degree of −53.2 kPa and a throughput rate of 30 kg/hr. After cooling, the ropes were granulated by a cutter to obtain pellets of polyamide resin composition. No deposition and blockade phenomena occurred at the feed opening (A), but the productivity was lower and strength and stiffness of the resulting composition were lower as compared with the method of Example 34. Moreover, the pellets were colored whitish yellow as compared with those in Example 34. Furthermore, the maximum burning time was long. The results are shown in Table 5.

TABLE 5

| | | | Example 34 | Example 35 | Example 36 |
|---|---|---|---|---|---|
| Polyamide resin | | Kind | a-1 | a-1 | a-1 |
| | | Feeding amount (kg/hr) | 29.4 | 29.4 | 14.7 |
| | | Feeding position Note 1) | 0 | 0 | 0 |
| Melamine phosphate-based flame-retarding agent | | Kind | b-1 | b-1 | b-1 |
| | | Feeding amount (kg/hr) | 15.6 | 15.6 | 7.8 |
| | | Feeding position Note 1) | 0.5 | 0.5 | 0 |
| Glass fiber | | Kind | c-1 | c-1 | c-1 |
| | | Feeding amount (kg/hr) | 15.0 | 15.0 | 7.5 |
| | | Feeding position Note 1) | 0.68 | 0.68 | 0.68 |

TABLE 5-continued

|  | | Example 34 | Example 35 | Example 36 |
|---|---|---|---|---|
| Melt viscosity of resin at the feeding position of melamine phosphate-base flame-retarding agent Pa.s Note 2) | | 85 | 85 | Unmeasurable |
| Degree of pressure reduction | cmHg | −40 | 0 | −40 |
| Flame retardancy (1/32 inch) | Average burning time (sec) | 1.5 | 1.9 | 4.3 |
| | Maximum buring time (sec) | 4.9 | 5.5 | 9.6 |
| | UL94 rank | VO | VO | VO |
| Bending strength | Mpa | 240 | 238 | 218 |
| Bending modulus | Gpa | 10.8 | 10.3 | 9.8 |
| Deflection in bending | mm | 4.0 | 3.8 | 3.5 |
| Productivity (discharge amount) | kg/hr | 60 | 60 | 30 |
| Stability of ropes | times Note 3) | 0 | 1 | 3 |

Note 1) The total length of barrel is indicated by 1, and the highest upstream side is indicated by 0, the middle is indicated by 0.5 and the lowest downstream side is indicated by 1.
Note 2) Melt viscosity of polyamide resin measured at resin measured at resin temperature at the feeding position of melamine phosphate-based flame-retarding agent and and at shear rate of 1000/sec.
Note 3) The breakage times of ropes per 30 minutes during compounding.

Industrial Applicability

The compositions of the present invention are molding materials which are very high in flame retardancy even when they are molded into thin-wall moldings, do not generate corrosive hydrogen halide gases when burning and, furthermore, have both excellent electric characteristics and excellent molding processability, and can be employed for uses such as appliance parts, electronic parts, automobile parts, etc.

What is claimed is:

1. A flame-retardant reinforced polyamide resin composition comprising (a) 30–70% by weight of a half-aromatic polyamide resin having a polyhexamethylene adipamide unit and a polyhexamethylene isophthalamide unit, (b) 10–38% by weight of a melamine polyphosphate, (c) 5–50% by weight of an inorganic reinforcing material, (d) 0–5% by weight of a polyalkylene polyhydric alcohol and/or a fatty acid ester derivative thereof, (e) 0–5% by weight of a bisamide compound, (f) 0–5% by weight of a metal oxide and/or a molybdate, and (g) 0–5% by weight of a metal salt of a higher fatty acid having 10–25 carbon atoms, where the ratio of the amounts of the half-aromatic polyamide resin (a) and the melamine polyphosphate (b) in the composition is 1.5–3.5, and the half-aromatic polyamide resin (a) is at least one polymer selected from the group consisting of (1) a copolymer comprising 70–95% by weight of a polyhexamethylene adipamide unit and 5–30% by weight of a polyhexamethylene isophthalamide unit; (2) a terpolymer comprising 60–89% by weight of a polyhexamethylene adipamide unit, 5–30% by weight of a polyhexamethylene isophthalamide unit and 1–10% by weight of an aliphatic polyamide unit other than polyhexamethylene adipamide; (3) a mixed polyamide containing 70–95% by weight of a polyhexamethylene adipamide component and 5–30% by weight of a polyhexamethylene isophthalamide component; and (4) a mixed polyamide containing 60–89% by weight of a polyhexamethylene adipamide component, 5–30% by weight of a polyhexamethylene isophthalamide component and 1–10% by weight of an aliphatic polyamide component other than polyhexamethylene adipamide.

2. A flame-retardant reinforced polyamide resin composition according to claim 1, wherein the amount of the polyalkylene polyhydric alcohol and/or the fatty acid ester derivative thereof (d) is 0.01–5% by weight.

3. A flame-retardant reinforced polyamide resin composition according to claim 2, wherein the polyalkylene polyhydric alcohol is at least one polyhydric alcohol selected from the group consisting of polyethylene glycol, polypropylene glycol and polybutylene glycol.

4. A flame-retardant reinforced polyamide resin composition according to claim 2, wherein the fatty acid ester derivative of the polyalkylene polyhydric alcohol is at least one higher fatty acid ester derivative of a polyhydric alcohol selected from the group consisting of polyethylene glycol monolaurate, polyethylene glycol monostearate, polyethylene glycol monooleate and polyethylene glycol distearate.

5. A flame-retardant reinforced polyamide resin composition according to claim 1, wherein the amount of the bisamide compound (e) is 0.01–5% by weight.

6. A flame-retardant reinforced polyamide resin composition according to claim 5, wherein the bisamide compound (e) is at least one saturated fatty acid bisamide selected from the group consisting of methylenebisstearic acid amide, ethylenebiscapric acid amide, ethylenebislauric acid amide, ethylenebisstearic acid amide, ethylenebisisostearic acid amide, ethylenebisbehenic acid amide, hexamethylenebisstearic acid amide and hexamethylenebisbehenic acid amide.

7. A flame-retardant reinforced polyamide resin composition according to claim 1, wherein the amount of the metal oxide and/or molybdate (f) is 0.01–5% by weight.

8. A flame-retardant reinforced polyamide resin composition according to claim 7, wherein the metal oxide is at least one alkaline earth metal oxide selected from the group consisting of beryllium oxide, magnesium oxide, calcium oxide, strontium oxide and barium oxide.

9. A flame-retardant reinforced polyamide resin composition according to claim 7, wherein the molybdate is at least one alkaline earth metal salt of molybdic acid selected from the group consisting of calcium molybdate, barium molybdate and strontium molybdate.

10. A flame-retardant reinforced polyamide resin composition according to claim 1, wherein the amount of the metal salt of higher fatty acid having 10–25 carbon atoms (g) is 0.01–5% by weight.

11. A flame-retardant reinforced polyamide resin composition according to claim 10, wherein the metal salt of higher fatty acid having 10–25 carbon atoms (g) is at least one alkaline earth metal salt of higher fatty acids which is selected from the group consisting of calcium salt, magnesium salt, zinc salt and aluminum salt of lauric acid, myristic acid, palmitic acid, stearic acid, behenic acid, cerotic acid, oleic acid and erucic acid.

12. A flame-retardant reinforced polyamide resin composition according to claim 1, wherein the melamine polyphosphate (b) contains 10–18% by weight of phosphorus atoms.

13. A flame-retardant reinforced polyamide resin composition according to claim 1, wherein the melamine polyphosphate (b) has an average particle diameter of 0.5–20 μm.

14. A flame-retardant reinforced polyamide resin composition according to claim 1, wherein the condensation degree of the melamine polyphosphate (b) is not less than 5.

15. A flame-retardant reinforced polyamide resin composition according to claim 1, wherein the inorganic reinforcing material (c) is at least one reinforcing material selected from the group consisting of glass fibers, wollastonite, talc, calcined kaolin and mica.

16. A method for producing a flame-retardant reinforced polyamide resin composition comprising (a) 30–70% by weight of a half-aromatic polyamide resin having a polyhexamethylene adipamide unit and a polyhexamethylene isophthalamide unit, (b) 10–381 by weight of a melamine polyphosphate, (c) 5–50% by weight of an inorganic reinforcing material, (d) 0–5% by weight of a polyalkylene polyhydric alcohol and/or a fatty acid ester derivative thereof, (e) 0–5% by weight of a bisamide compound, (f) 0–5% by weight of a metal oxide and/or a molybdate, and (g) 0–5% by weight of a metal salt of a higher fatty acid having 10–25 carbon atoms, where the ratio of the amounts of the half-aromatic polyamide resin (a) and the melamine polyphosphate (b) in the composition is 1.5–3.5, and the half-aromatic polyamide resin (a) is at least one polymer selected from the group consisting of (1) a copolymer comprising 70–95% by weight of a polyhexamethylene adipamide unit and 5–30% by weight of a polyhexamethylene isophthalamide unit; (2) a terpolymer comprising 60–89% by weight of a polyhexamethylene adipamide unit, 5–30% by weight of a polyhexamethylene isophthalamide unit and 1–10% by weight of an aliphatic polyamide unit other than polyhexamethylene adipamide; (3) a mixed polyamide containing 70–95% by weight of a polyhexamethylene adipamide component and 5–30% by weight of a polyhexamethylene isophthalamide component; and (4) a mixed polyamide containing 60–89% by weight of a polyhexamethylene adipamide component, 5–30% by weight of a polyhexamethylene isophthalamide component and 1–10% by weight of an aliphatic polyamide component other than polyhexamethylene adipamide, said method comprising using a twin-screw extruder provided with side feed openings at two or more positions, and feeding at least the half-aromatic polyamide resin (a) from the feed opening provided at the top position of the twin-screw extruder, and the melamine polyphosphate (b) and the inorganic reinforcing material (c) from any one of the side feed openings, followed by kneading them.

* * * * *